Dec. 8, 1942.     D. D. ROGERS     2,304,422
MOWING MACHINE
Filed April 1, 1942     3 Sheets-Sheet 2
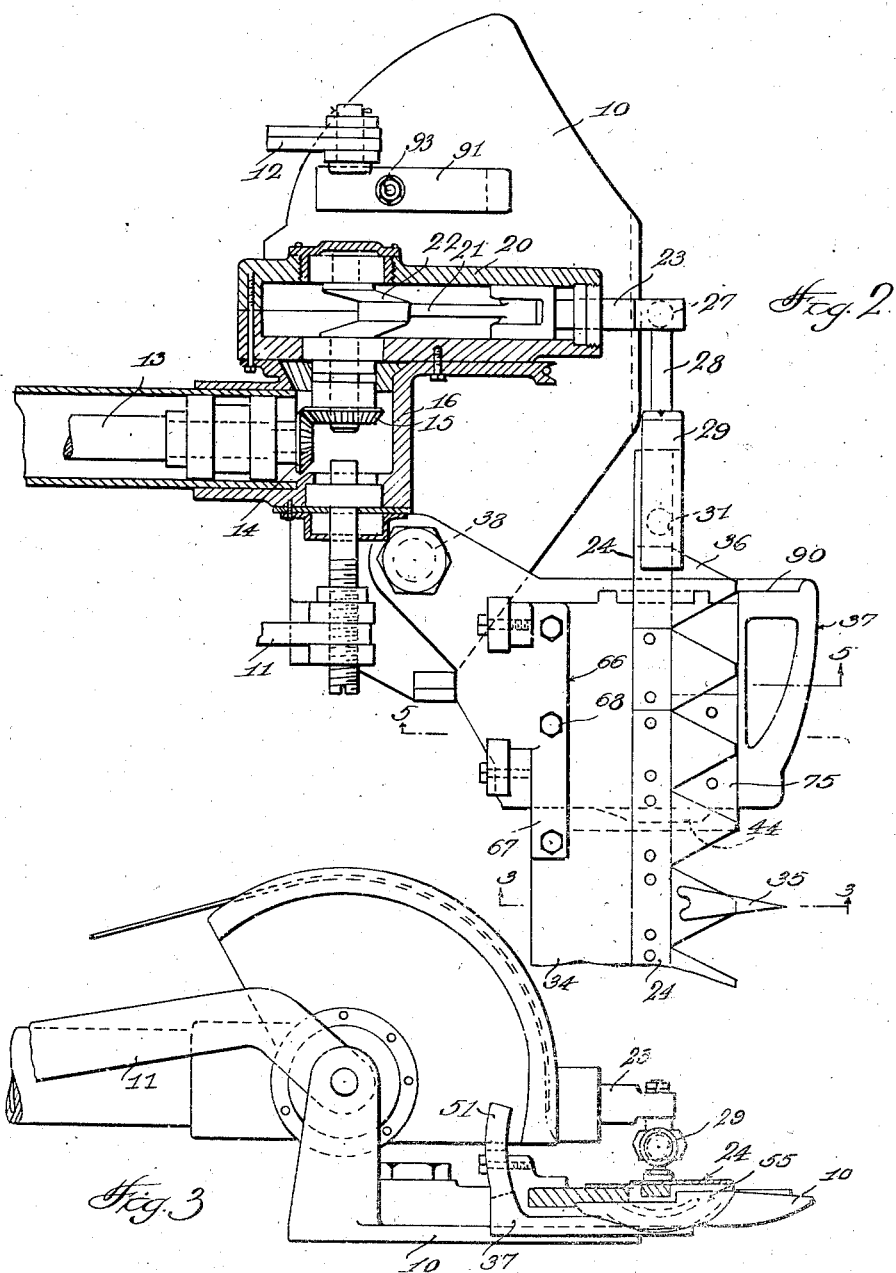
Inventor
Daniel D. Rogers
By
Munn, Liddy, Glaccum & Kane
Attorney

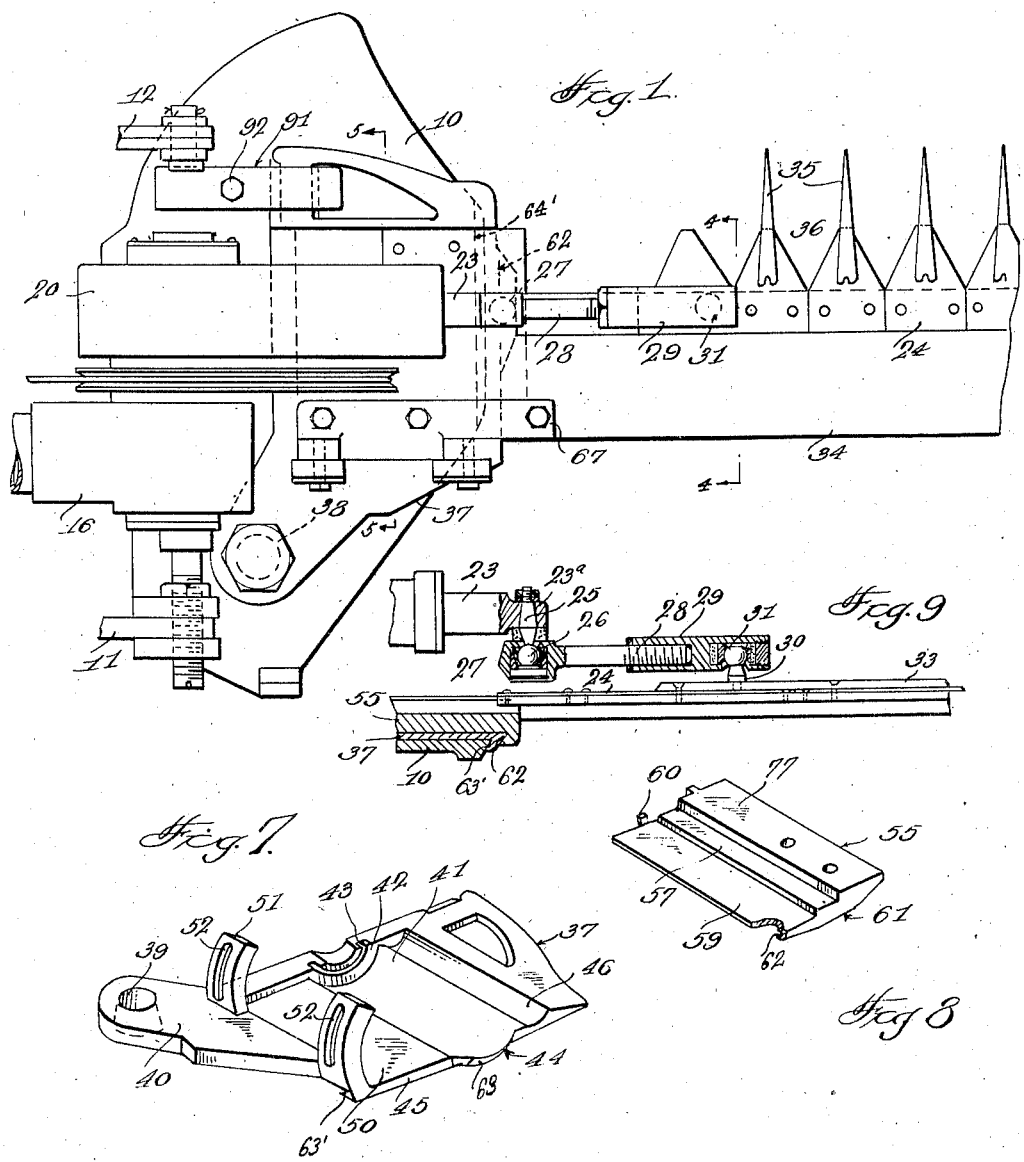

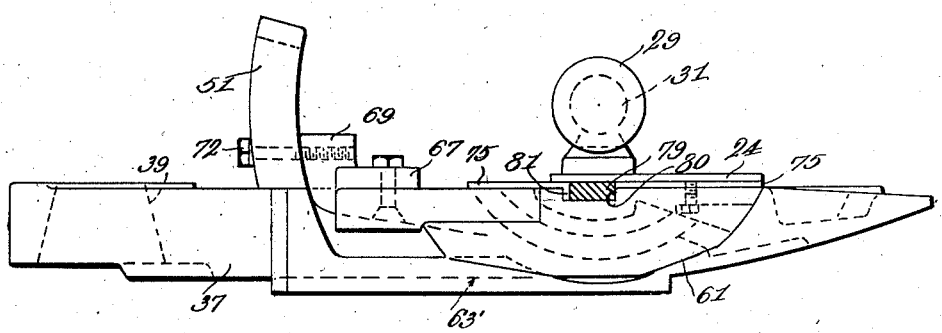
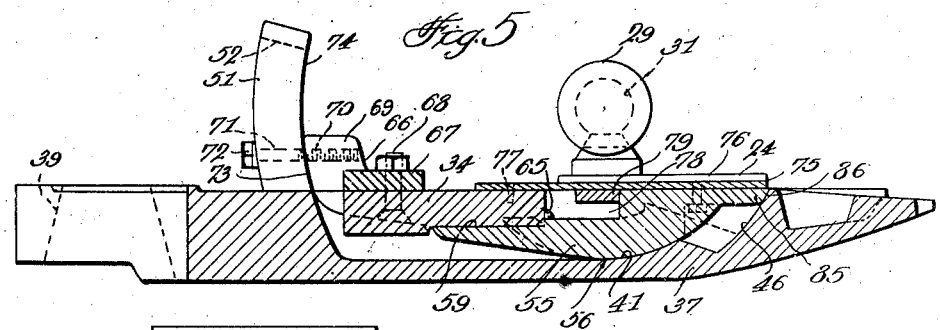
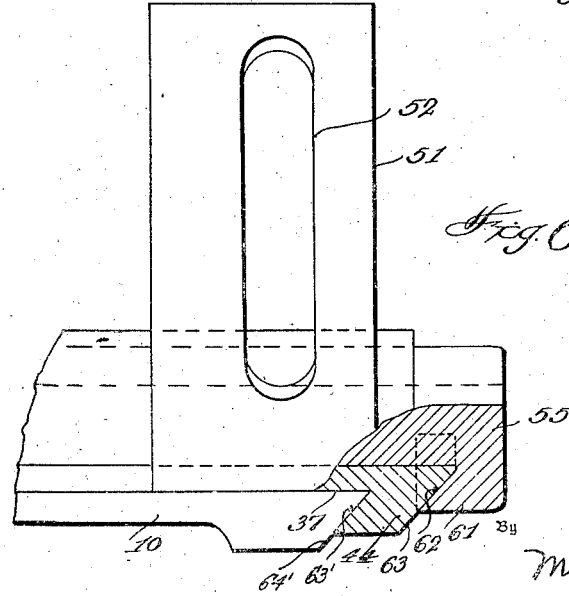

Patented Dec. 8, 1942

2,304,422

UNITED STATES PATENT OFFICE 2,304,422

MOWING MACHINE

Daniel D. Rogers, Columbia, S. C.; Laura L. Rogers, administratrix of said Daniel D. Rogers, deceased Application April 1, 1942, Serial No. 437,263

5 Claims. (Cl. 56—276)

This invention relates to a mowing machine and is more particularly directed to a device for adjustably positioning the cutter bar and likewise the sickle at various angles to the surface over which the cutter bar is moving.

An object of the invention is the provision of a device forming part of a mowing machine for rocking the cutter bar along a longitudinal axis so that the cutter bar and sickle may be adjustably positioned relative to the ground surface so that the material which is being mowed may be cut closer to the ground or farther away.

Another object of the invention is the provision of a device which is placed upon an improved cutter bar mount so that the cutter bar and sickle may be adjustably positioned or rocked along a longitudinal axis so that the depth of cut of the sickle may be varied, said device including a rocker to which is secured the cutter bar with the rocker being adjustably supported in the cutter bar mount having a particular construction for supporting the rocker so that the rocker will be held in a predetermined position and against movement during the cutting operation after the rocker has been adjustably positioned.

A further object of the invention is the provision of a cutter bar mount which is pivotally supported on the usual shoe of a mower and which has provision for receiving a carrier for one end of a cutter bar, cooperating means being formed on the carrier and mount for maintaining the carrier in proper position during rocking of the carrier for adjustably positioning the cutter bar, cooperating means also being employed on the mount and the carrier for securing the carrier in a predetermined adjusted position.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a fragmentary plan view of a portion of a mower showing a shoe and cutter bar mount with my improved rocker or carrier for adjustably positioning a cutter bar for varying the height of the cut of the material.

Figure 2 is a similar plan view partly in section showing the cutter bar moved to an inoperative position.

Figure 3 is a section taken along the line 3—3 of Fig. 2.

Figure 4 is a section taken along the line 4—4 of Fig. 1.

Figure 5 is a section taken along the line 5—5 of Fig. 1.

Figure 6 is a fragmentary view partly in section of the cutter bar mount.

Figure 7 is a view in perspective of my improved cutter bar mount.

Figure 8 is a view in perspective of a rocker or cutter bar carrier which is adapted to be seated for adjustment on the cutter bar mount shown in Fig. 7.

Figure 9 is a fragmentary side view in elevation of the operative connections between the power operating means and the sickle.

Referring more particularly to the drawings, it will be seen that a shoe 10 is illustrated which is usually carried by pivoted arms 11 and 12 that in turn are connected with a supporting frame for the mower element which projects laterally from a tractor in an operative mowing position. Since the present device is an improvement over the cutting apparatus described in my application Serial No. 362,448 filed Oct. 23, 1940, and since all of the operating mechanism for the sickle bar and for raising the cutter bar and sickle bar to various positions have been thoroughly described in the above entitled appllication, only so much of those elements will be referred to in the present case as will be necessary to show the relationship of the sickle bar and the operating means therefor.

Referring more particularly to Fig. 2 it will be seen that a driving shaft 13 operates a gear 14 which in turn revolves a gear 15 located in a housing 16 which is supported by the shoe 10.

A second housing 20 contains a pitman 21 operated by a chank shaft 22 which in turn is revolved by the gear 15. The pitman 21 is connected to a reciprocating member 23 which operates a sickle generally designated by the numeral 24.

Referring more particularly to Fig. 9 it will be seen that the reciprocating member 23 has a head 23a which receives a bolt 25 at its outer end and this bolt carries a ball 26 at its lower end which is received by a connection 27 on the inner end of a link 28. The ball 26 and the connection 27 forms a universal joint so that the link 28 may be revolved on its horizontal axis while the inner end of the link may swing on the ball 26 as a pivot. A casing 29 is secured to the outer end of the link 28 and a universal connection is had with the post 30 by means of a ball 31 and a socket 32. The post 30 is connected to a plate 33 that in turn is secured to the sickle bar 24. By this construction the sickle bar may be rocked along a longitudinal axis when the cutter bar 34 is rocked in a manner to be presently described.

The cutter bar has teeth 35 which are slotted in the usual manner so that the sickle blades 36 may be moved through the slots for creating a shearing action on the stalks of growing vegetation. The bar 34 has its inner end secured upon a mount generally designated by the numeral 37 which is pivotally mounted on the shoe 10, by means of a frusto-conically shaped bolt 38 projecting upwardly from the shoe and secured thereto. This bolt passes through a frusto-conically shaped passage 39 in a projection 40 of the mount 37.

The mount consists of a flat plate which rests upon the shoe 10 and pivoted at 38 on said plate. Intermediate the ends of the plate and transversely thereof is provided a curved seat 41 wich is depressed below the upper surface of the mount and terminates at one end of the plate adjacent an upstanding wall 42. This wall is provided with a circular groove 43 facing the curved seat 41. At the opposite end of the seat as shown at 44 a curved rib or lip projects laterally from a side edge 45 of the mount.

At one side of the seat 41 of the mount is provided a curved socket 46 for a purpose which will be presently explained. At the other side of the seat is shown a flat portion 50 and at the end of this flat portion are integrally formed a plurality of upstanding arms 51 and each arm is provided with an elongated slot 52.

A rocker bar generally designed by the numeral 55 and shown more particularly in Fig. 3 has a curved bottom portion 56 adapted to be located on the curved seat 41 and the curvature of the seat and the bottom of the rocker 55 are complementarily formed so that this bar can be rocked on the seat for a purpose which will be presently explained.

This bar has a pair of stepped portions 57 and 59. A curved rib 60 projects laterally from one end of the rocker and is adapted to be received within the curved groove 43 for aiding in guiding the rocker in its movements. A flange 61 depends from the outer end of the rocker 55 and opposite to the rib 60. This depending flange is undercut to provide an inclined surface 62 which engages around a complementarily formed inclined surface 63 on the member 44. These inclined surfaces are curved to conform to the curvature of the groove 43 and the rib 60 so that the bar 55 will be guided in its rocking movement.

The cutter bar as shown more particularly in Figs. 2, 4 and 5, extends over the rocker bar 55 and is seated within the stepped portion 59 of said bar. The cutter bar 34 is welded at 65 to the rocker bar 55.

A bracket generally designated by the numeral 66 consists of a plate 67 which is bolted at 68 to the bar 34. A pair of arms 69 extend upwardly and laterally from the plate 67 in line with the arms 51. Each of the arms 69 are provided with a threaded passage 70 adapted to receive a bolt 71 which passes through the slots 52 so that when the bolts are screwed up tight the heads 72 on the bolts will engage the outer walls of the arms 51 and secure the bracket 66, cutter bar 34 and the rocker bar 55 in a fixed position. It will be noted that the outer face of each arm 69 is curved as shown at 73 to conform to the curved surfaces 74 of the arms 51.

A plate 75 (Figs. 2, 4 and 5) is secured at 76 to the flat portion 77 of the rocker bar 55. This flat plate is approximately half the width of the mount 37 and extends over the rocker bar 55 and is secured at 77 to the cutter bar 34, thereby leaving a chamber 78 between the upper surface of the rocker bar 55 and inner surface of the plate 75. It will be noted that the sickle bar 24 is in flat engagement with the upper surface of the plate 75. However, a guide bar 79 which is secured to the sickle bar 24 is located within the chamber 78 and has one edge engaging the flat wall 80 of said chamber 78 while the opposite edge of the guide bar 79 engages a depending flange 81 formed on the plate 75. This construction provides a guide for the sickle bar 24 for maintaining the sickle bar in longitudinal alinement with the cutter bar 34 and guides the sickle bar in its reciprocating movement when operated by the connecting rod 23.

The rocker bar 55 has an elongated lip 85 which projects into the pocket 46 in the mount 37 so that when the bar 55 is rocked this lip will move downwardly into the pocket with the curved edge 86 of the lip riding on the curved surface of said pocket for aiding in stabilizing and guiding the rocker bar in the mount 37.

The mount 37 is provided with a curved lip which forms a latch member 90 and which is adapted to engage beneath a spring member 91 secured at 92 to the shoe 10 so that when the cutter bar and sickle bar are in an operative position as shown in Fig. 1 the mount will be secured in place agaist movement, but when the sickle bar strikes an obstruction the latch will be released from the spring member so that the cutter bar 34 may be moved to the position shown in Fig. 2 and out of the way of the obstruction.

By the above described construction it is possible to change the cutter bar 34 and the sickle bar 24 at an angle to the horizontal and at various angles to the position shown in Figs. 4 and 5 so that the stalks of vegetation may be cut at a different horizontal level when desired or when necessary. The cutter bar and likewise the sickle bar are adjusted by loosening the bolts 71 so that the heads 72 of the bolts will be moved away from the outer curved surfaces of the arms 51. In this loose position the rocker bar 55 may be tilted to any angle desired, but such angle must be limited by the movement of the bolt 71 within the elongated slots 52 in the arms 51. When the bar 55 is rocked on its seat 41 the cutter bar and sickle bar will be tilted at an angle to the horizontal and along a horizontal axis passing through the center of the rocker bar. When the proper adjustment has been made the bolts 71 are again tightened and the rocker bar together with the cutter bar and sickle bar will be properly positioned.

In view of the fact that the connection between the sickle bar 24 and the link 28 is of the universal joint type the ball 31 will rock in its seat 32 when the bar 55 is rocked.

When the bar 55 is rocked the cooperating rib 60 and groove 43 together with the rib 44 and the depending flange 61 will guide the rocker arm so that it will not be displaced from its proper position on the seat 41 of the mount 37.

The seat 41 is curved along an arc of a circle whose center falls at the center of the ball 31 so that the whole unit including the cutter bar 34 and bar 55 may move along the arc of said circle when the unit is adjusted.

When the mount 37 is moved to the position shown in Fig. 1 an inclined and undercut portion 63' of the lip 44 on one side of the mount 37 will engage a complementarily beveled portion 64' on one edge of the shoe 10 (Fig. 6) for aiding in retaining the mount in position in cooperation with the latch members 90 and 91.

I claim:

1. An adjustable mounting for a cutter bar of a mower comprising a shoe, a cutter bar, a cutter bar mount pivoted at one end on one end of said shoe, a wall rising along one edge of the mount and provided with an arcuate groove, said mount having a transversely disposed concave seat in line with the grooves, a cutter bar rocker having a curved face located in the seat and an arcuate rib at one end projecting into the arcuate groove, cooperating means on the other end of the rocker and the mount for aiding in guiding the rocker in a curved path when adjusted, means for securing one end of the cutter bar to the rocker, and means for retaining said rocker in an adjusted position.

2. An adjustable mounting for a cutter bar of a mower comprising a shoe, a cutter bar, a cutter bar mount pivotally supported at one end on one end of said shoe, a rockable bar to which one end of the cutter bar is attached, said mount and rockable bar having cooperating engaging elements so that the rockable bar may be adjustably positioned on the mount, the rockable bar having a curved rib, the mount having an arcuate groove to receive the rib, means on the rockable bar and mount cooperating with the groove and rib for maintaining the rockable bar in a curved path when adjusted, and means securing the rockable bar in an adjusted position.

3. An adjustable mounting for a cutter bar of a mower comprising a shoe, a cutter bar, a cutter bar mount pivotally supported on the shoe, a bar to which the inner end of the cutter bar is attached rockably supported on the mount, a curved rib projecting from one end of the mount, a curved rib extending from one end of the rockable bar, said rockable bar and mount each having a groove to receive the curved rib on the other member so that the rockable bar will be guided in a curved path when adjusted, the mount having a pocket, a lip projecting from the rockable bar and engaging a wall of the pocket for aiding in maintaining the rockable bar in position, and cooperating means on the mount and rockable bar for securing said bar in an adjusted position.

4. In a mower, a shoe supported by said mower, a cutter bar projecting laterally from the mower, a cutter bar mount pivotally carried by the shoe, and provided with a curved seat, a rockable bar having a rounded bottom slidably mounted on the seat, said cutter bar having one end secured to the rockable bar so that when the rockable bar is adjusted on its seat the cutter bar will be disposed in a plane at an angle to the horizontal, means for maintaining the rockable bar on the mount and for guiding said bar in a curved path when adjusted, said mount having curved upstanding arms provided with slots and bolts projecting from the rockable bar and received by the slots for securing said bar in an adjusted position.

5. In a mower, a shoe supported by said mower, a cutter bar projecting laterally from the mower, a cutter bar mount pivotally carried by the shoe and provided with a curved seat, a rockable bar having a rounded bottom slidably mounted on the seat, said cutter bar having one end secured to the rockable bar so that when the rockable bar is adjusted on its seat, the cutter bar will be disposed in a plane at an angle to the horizontal, means for maintaining the rockable bar on the mount and for guiding said bar in a curved path when adjusted, a sickle bar mounted for reciprocation longitudinally on the cutter bar, means for reciprocating the sickle bar including a link having a socket, a ball located in the socket and carried by the sickle bar, the curved seat being on an arc of a circle whose center is located at the center of the ball, and means for securing the rockable bar in an adjusted position.

DANIEL D. ROGERS.